United States Patent [19]
Chun-Jung

[11] Patent Number: 5,465,927
[45] Date of Patent: Nov. 14, 1995

[54] METAL BRACKET FOR A PRINTED CIRCUIT BOARD

[75] Inventor: Cho Chun-Jung, Taoyuan, Taiwan

[73] Assignee: Acer Peripherlas, Inc., Taoyuan, Taiwan

[21] Appl. No.: 147,629

[22] Filed: Nov. 5, 1993

[51] Int. Cl.⁶ ................................................. F16M 13/00
[52] U.S. Cl. .......................................... 248/271; 248/674
[58] Field of Search ............................... 248/27.1, 674, 248/675, 220.2, 224.4, 27.3, 904, 551; 361/724, 736, 752, 796; 211/41; 312/7.2, 223.2, 8.14, 22, 23

[56] References Cited

U.S. PATENT DOCUMENTS

| | | | |
|---|---|---|---|
| 3,737,206 | 6/1973 | Pierce et al. | 312/7.2 |
| 4,964,017 | 10/1990 | Jindrick et al. | 361/725 X |
| 4,979,636 | 12/1990 | Daly | 361/724 X |
| 5,016,142 | 5/1991 | White | 211/41 X |
| 5,105,339 | 4/1992 | Olsson et al. | 211/41 X |
| 5,199,776 | 4/1993 | Lin | 312/293.3 |
| 5,235,493 | 8/1993 | Yu | 312/223.2 X |
| 5,351,176 | 9/1994 | Smith et al. | 248/917 X |
| 5,366,185 | 11/1994 | Michael et al. | 248/27.1 |

FOREIGN PATENT DOCUMENTS

| | | | |
|---|---|---|---|
| 2262388 | 6/1993 | United Kingdom | 361/724 |
| 3006412 | 4/1993 | WIPO | 248/551 |

Primary Examiner—Karen J. Chotkowski
Attorney, Agent, or Firm—Fish & Richardson

[57] ABSTRACT

A metal bracket for the printed circuit board is provided. The bracket comprises a bracket plate and a removable cover plate. The bracket plate has an first surface of an internal side and a second surface of an external side. A window with an inner rim is formed on the substantially central area of the bracket plate and the inner rim has at least a first connecting devices. At least a second connecting devices is connected to the first surface for securing the printed circuit board with the bracket plate. The removable cover plate has a third connecting devices coupled to the first connecting devices for securing the removable cover plate with the bracket plate. The cover plate substantially covers the window on the external side which prevents the leakage of the electromagnetic wave emitted from the printed circuit board.

6 Claims, 3 Drawing Sheets

METAL BRACKET FOR A PRINTED CIRCUIT BOARD

TECHNICAL FIELD OF THE INVENTION

The invention relates to in general to a metal bracket for a printed circuit board and, in particular, to a bracket for a printed circuit board within a video display device.

BACKGROUND OF THE INVENTION

It has been recognized that the video display devices of larger size will soon prevail over those of smaller size in the market. However, in order to solve the leakage of the electromagnetic wave from the printed circuit board (PCB) within the video display device of larger size, typically, the cathode ray tube (CRT) and the PCBs are surrounded and housed by implementation of the metal brackets 11, 12 and 13 as shown in FIG. 1. The design of the type as shown though has solved the leakage problem, it will be inconvenient to fix or replace the components on the PCBs, since the structure of the bracket 11, 12 and 13 must be first disassembled, when the components malfunction and must be replaced.

SUMMARY OF THE INVENTION

To the shortcomings of the conventional approach recited above, the present invention provides a bracket which has a window covered by a removable cover plate for the most of the times when the video display device is in normal operation mode. And when the components of the PCBs are to be repaired or replaced, the removable cover plate is first removed from the bracket. The maintenance engineer may then have easy access to the soldering points of the components concerned without disassembling the whole brackets structure.

The metal bracket provided comprises a bracket plate and a removable cover plate. The bracket plate has an first surface of an internal side and a second surface of an external side. A window with an inner rim is formed on the substantially central area of the bracket plate and the inner rim has at least a first connecting means. At least a second connecting means is connected to the first surface for securing the printed circuit board with the bracket plate. The removable cover plate has a third connecting means coupled to the first connecting means for securing the removable cover plate with the bracket plate. The removable cover plate substantially covers the window on the external side which prevents the leakage of the electromagnetic wave emitted from the printed circuit board.

The utility and characteristic of the invention may be further understood with the following recitation on the invention accompanied by the appended drawings.

DETAILED DESCRIPTION OF THE PRESENT INVENTION

Figure 1:
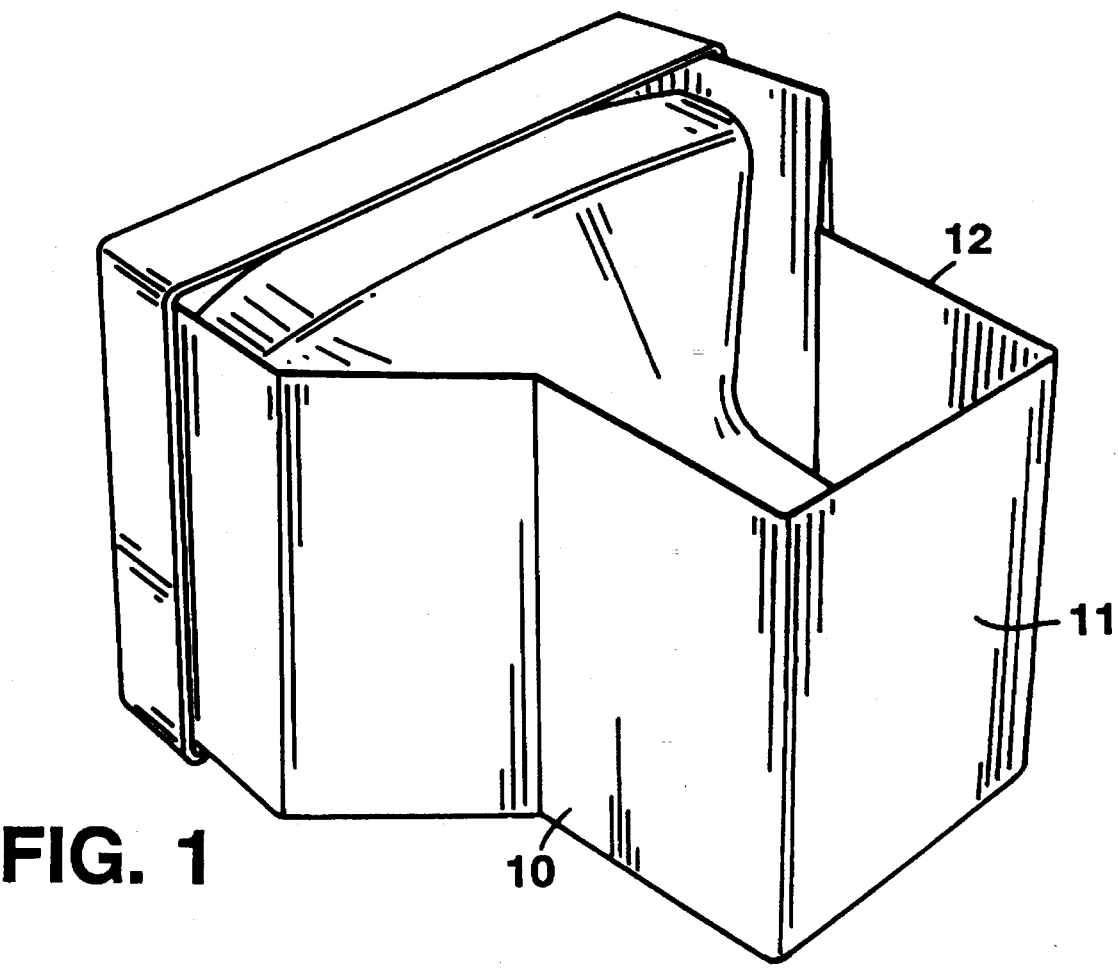
FIG. 1 show a perspective view of the brackets structure for the printed circuit boards within a video display device according to the conventional approach.
Figure 2:
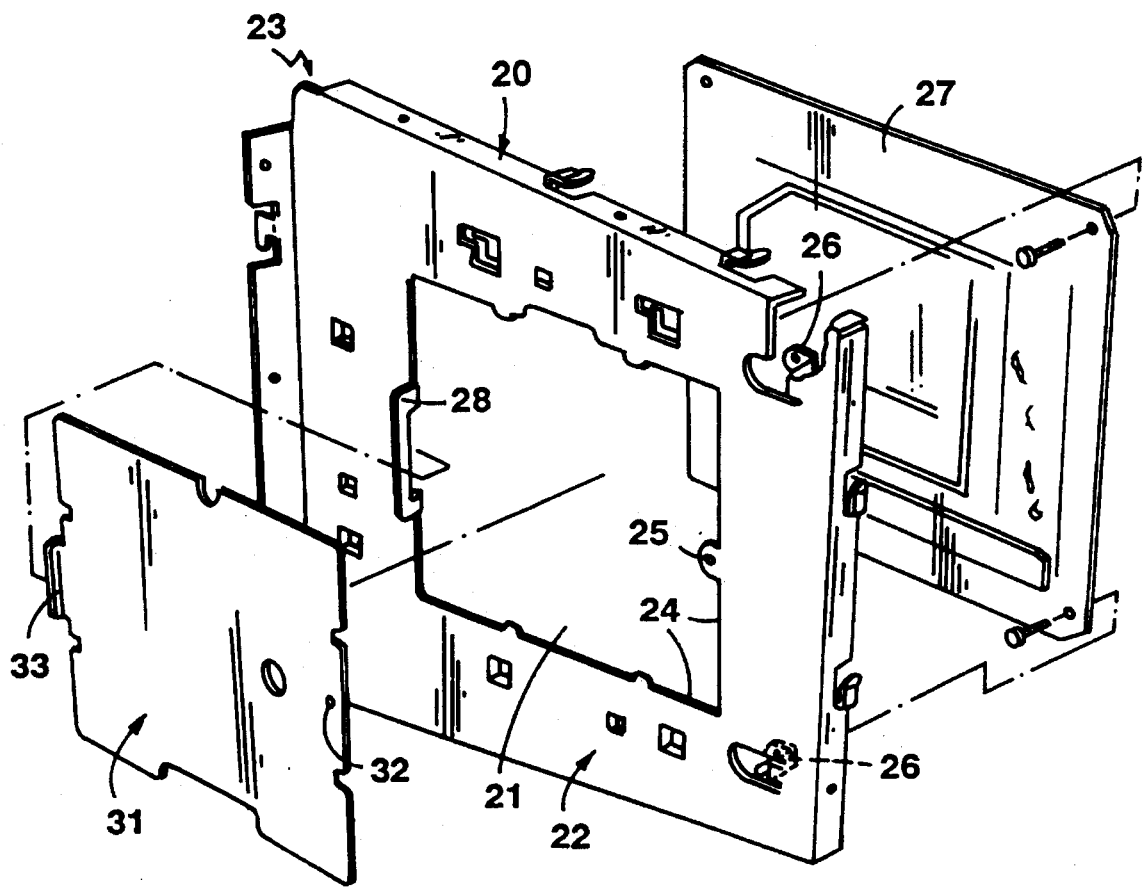
FIG. 2 shows an explosive schematic of the members of the bracket of the invention.

As shown in FIG. 2, the invention comprises a bracket plate 20 and a removable cover plate 31. The bracket plate 20 has an first surface 23 of an internal side and a second surface 22 of an external side. A window 21 with an inner rim 24 is formed on the substantially central area of the bracket plate 20. The inner rim 24 of the bracket plate 20 has at least a first connecting device 25. At least a second connecting device 26 is connected to the first surface 23 for securing the printed circuit board 27 with the bracket plate 20.

The removable cover plate 31 has a third connecting device 32 connected to the first connecting device 25 for securing the removable cover plate 31 with the bracket plate 20. The removable cover plate 31 substantially covers the window 21 on the external side and prevents the leakage of the electromagnetic wave emitted from the PCB 27.

Figure 3:
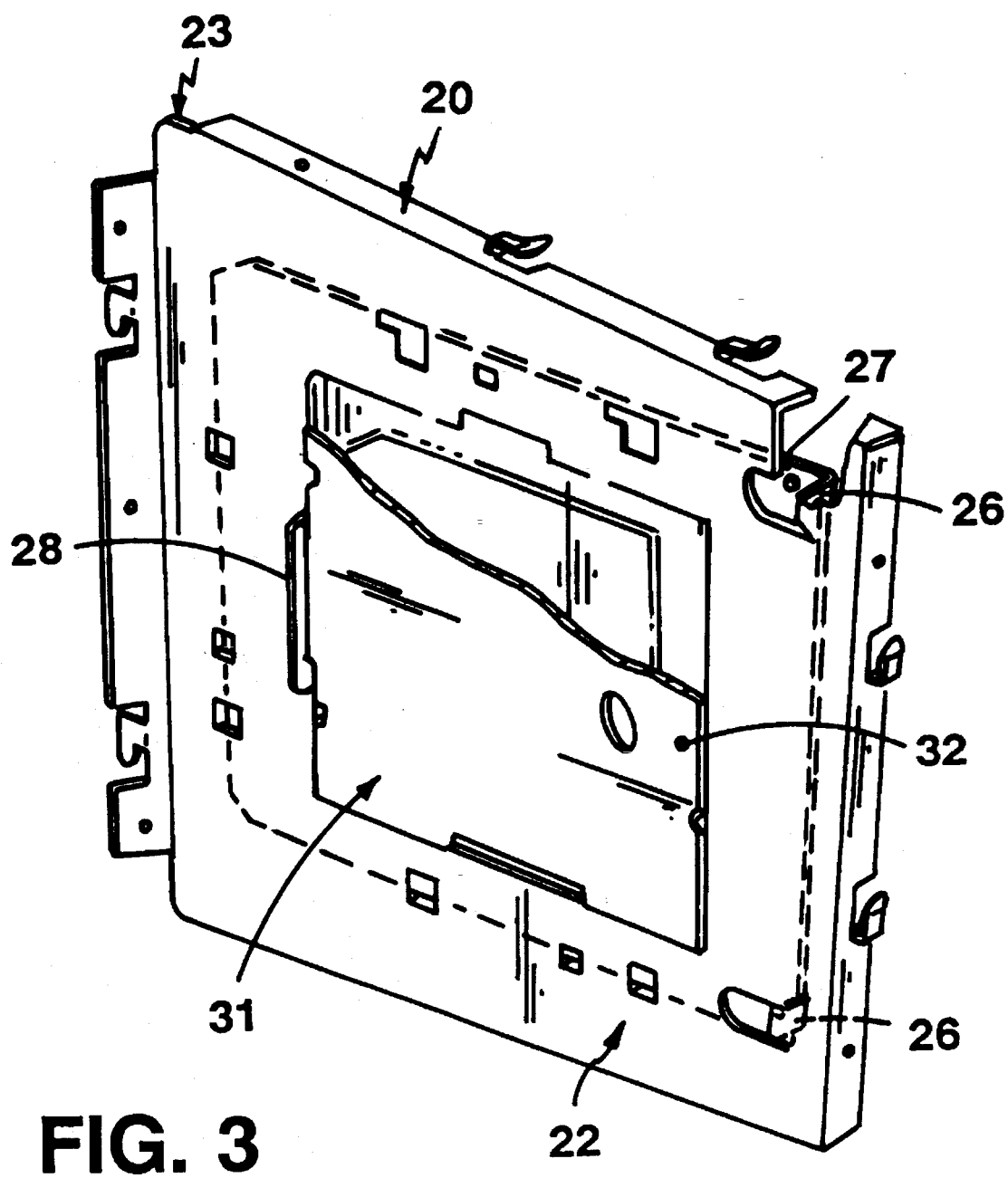
FIG. 3 shows an perspective view of the bracket when assembled.

The bracket plate 20 further comprises a first positioning device 28 along the inner rim 24 and the removable cover plate 31 further comprises a second positioning device 33. The first positioning device 28 is engaging with the second positioning device 33 when the removable cover plate 31 is attached to the bracket plate 20. One preferred embodiment of the first positioning device 28 and the second positioning device 33 are a slit and an upright flange respectively as shown in FIG. 2. The bracket of the invention is shown in FIG. 3 when the recited members are assembled together.

When the repairs of the printed circuit board 27 is needed, first disconnect the first connecting device 25 from the second connecting device 26. Afterwards, the removable cover plate 31 is removed by disengaging the first positioning device 28 with the second positioning device 33. The soldering spots of the printed circuit board 27 are therefore exposed for the repairs.

The window 21 may be formed by a punch pressing process, which is known to persons skillful in the arts, and a residual plate is obtained as a result of the punch pressing process. The removable cover plate 31 may be manufactured by using the residual plate obtained from the punch pressing process. One further metal manufacture process is only needed to form the second positioning device 33, such as an upright flange shown in FIG. 2.

It has to be understood that the above preferred embodiment is an illustrative, rather than a limiting purpose and, therefore, not only the invention, but also the equivalence thereof are intended scope of the protection of the invention which is defined by the following claims.

What is claimed is:

1. A metal bracket for a printed circuit board, the printed circuit board defining a major board plane and generating an electromagnetic wave when operating, comprising: a bracket plate having a first surface on an internal side and a second surface on an external side, both of the first and second surfaces being substantially parallel to said major board plane, a window with an inner rim being formed on a substantially central area of the bracket plate for allowing a repair tool to access said major board plane of the printed circuit board, the inner rim having at least a first connecting means and at least a second connecting means connected to the first surface for securing the printed circuit board with the bracket plate;

a removable cover plate having a third connecting means coupled to the first connecting means for securing the cover plate with the bracket plate, the cover plate substantially covering the window on the external side preventing the leakage of the electromagnetic wave emitted from the printed circuit board.

2. The bracket recited in claim 1, wherein the bracket plate further comprising a first positioning means and the removable cover plate further comprises a second positioning means, the first positioning means being engaging with the second positioning means.

3. The bracket recited in claim 1, wherein the window being formed by a punch pressing process and a residual plate being obtained.

4. The bracket recited in claim 3, wherein the removable cover plate being formed by at least a further metal manufacture process on the residual plate.

5. The bracket recited in claim 2, wherein the first positioning means being a slit.

6. The bracket recited in claim 2, wherein the second positioning means being a upright flange.

* * * * *

UNITED STATES PATENT AND TRADEMARK OFFICE
CERTIFICATE OF CORRECTION

PATENT NO.   : 5,465,927

DATED        : November 14, 1995

INVENTOR(S)  : Cho Chun-Jung

It is certified that error appears in the above-identified patent and that said Letters Patent is hereby corrected as shown below:

On the title page, item [73],
Under the listing of the Assignee, replace "Acer Peripherlas, Inc." with --Acer Peripherals, Inc.--

Signed and Sealed this

Twenty-fifth Day of November, 1997

*Attest:*

BRUCE LEHMAN

*Attesting Officer*      *Commissioner of Patents and Trademarks*